Figure 1:
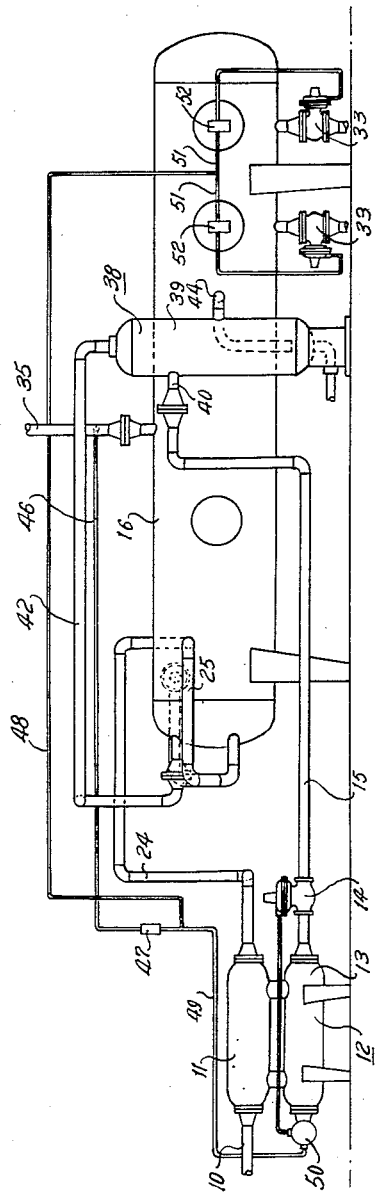

INVENTOR
Robert W. Coggins
BY
ATTORNEYS

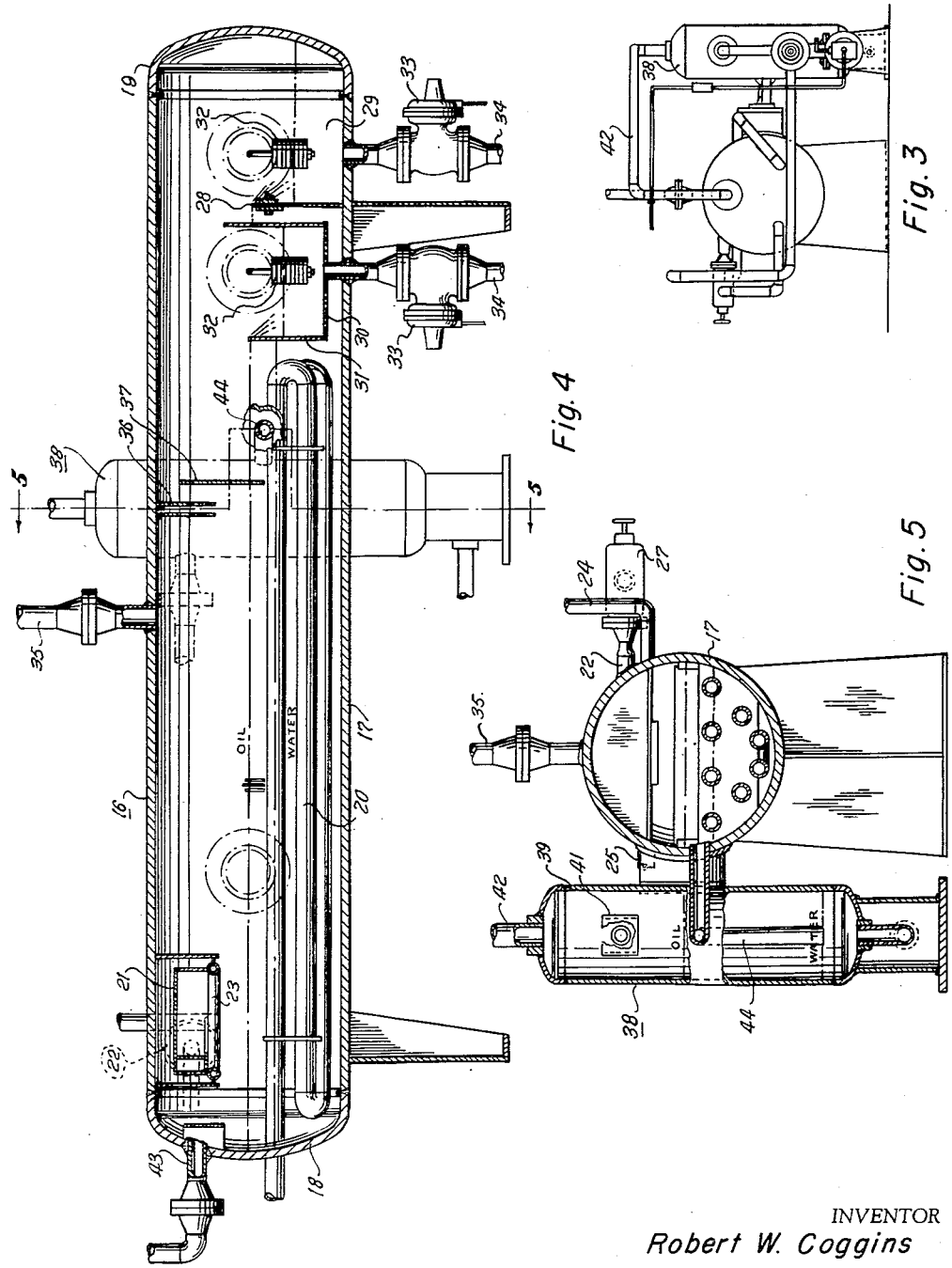

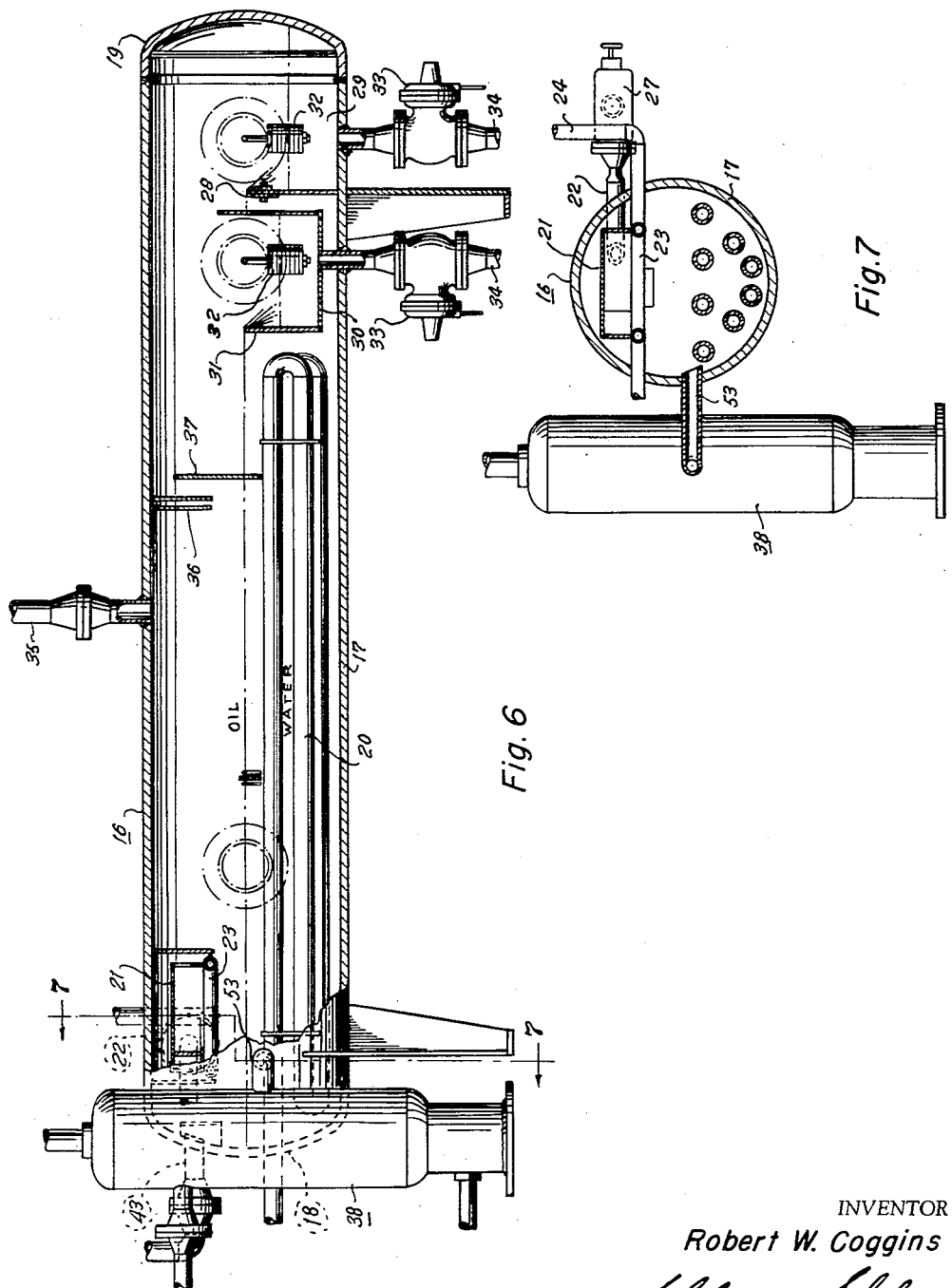

2,809,713
Patented Oct. 15, 1957

2,809,713

METHODS AND MEANS FOR LOW TEMPERATURE OIL AND GAS SEPARATION

Robert W. Coggins, Tulsa, Okla., assignor to National Tank Company, Tulsa, Okla., a corporation of Nevada Application July 9, 1956, Serial No. 596,486

14 Claims. (Cl. 183—2.7)

This invention relates to new and useful improvements in methods and means for low temperature oil and gas separation.

The invention is particularly concerned with low temperature separation systems for high pressure well streams wherein the well stream is caused to undergo a temperature reduction by means of a pressure drop or other suitable means for cooling, followed by resolution of the chilled gas stream into its water, oil and gas components and heating of the liquid phases to melt any gas hydrates or ice particles which may be present, as well as to effect a degree of stabilization or rectification of the separated oil or distillate. In some instances, in separation systems of this type, and especially in those systems handling a well stream of relatively high oil or distillate content, it has been found difficult to supply sufficient heat to the separated liquid phases to prevent freezing of the system by accumulation of gas hydrates or ice particles, or to obtain the desired degree of stabilization of the separated hydrocarbon liquids. In most cases, heat is supplied to the low temperature separation vessel, within which the stratification of the chilled well stream occurs, by means of coils in the lower portion of the vessel through which the relatively warm well stream is passed prior to its reduction in temperature. Because of the limitations of construction design in high pressure vessels, as well as the rather definite limitations of space within any given vessel, only a given amount of heating coil area or surface may be provided within the low temperature separation vessel. Sometimes this coil area is not adequate to provide the desired quantity of transferred heat, and improper operation of the system, or freezing up of the apparatus has resulted.

It is customary to pass the well stream, prior to pressure reduction or chilling, through a high pressure separator in which any liquids which may be present are removed from the well stream, the separated gas then being passed through the pressure reduction or chilling step and then to the low temperature separation vessel. The liquids separated in the high pressure separator are relatively warm and may be introduced into the low temperature separation vessel as an additional source of heat to prevent freezing or faulty operation of the system. Such introduction of the separated liquids is desirable in any event in order that the efficient separation and rectification which is obtained in the low temperature separation vessel may also be applied to these liquids.

As set forth in U. S. Letters Patent of Jay P. Walker et al., No. 2,747,002, issued May 22, 1956, the use of an elongate, horizontal, low temperature separation vessel is highly desirable to obtain more efficient separation and rectification of the various well stream components. Difficulties arise, however, in such a vessel when it is sought to deliver into the vessel as an additional source of heat those liquids previously separated from the well stream in the high pressure separator. If the liquids are introduced into the low temperature separation vessel at the inlet end thereof, they are subjected to the action of the layer of very cold gas present in the upper portion of the vessel so that the supplemental heating effect of the liquids is largely lost. Hence, the liquids must be introduced at a point in the vessel in which they do not come into contact with the cold gas stratum.

A warm gas zone may be established and maintained within the low temperature separation vessel by means of a gas seal baffle structure as set forth in United States Letters Patent No. 2,738,026, issued March 13, 1956, and the liquids from the high pressure separator may be introduced into this warm gas zone so that the heat of the liquids is conserved and made available and usable within the low temperature separation vessel. These liquids, however, are under high pressure and contain considerable quantities of gas which is evolved upon the introduction of the liquids into the low temperature separation vessel which is operating at a lower pressure. Accordingly, the gases which separate or flash from the liquids upon introduction thereof into the low temperature separation vessel follow only a short flow path within the vessel to reach the gas outlet therefrom, and they are therefore not sufficiently chilled to precipitate water and hydrocarbons therefrom. For this reason, the water and distillates present within the flash gas from the liquids cause the formation of gas hydrates, and the precipitation of distillates in the gas discharge line and ultimately clog or impede the gas discharge line by their accumulation therein.

It is, therefore, the principal object of this invention to provide improved methods and means for low temperature separation of oil and gas in which the preliminarily separated liquids may be employed as a supplementary source of heat for the low temperature separation step without foregoing effective separation and rectification of all of the well stream components, and whereby freezing or loss of efficient operation is avoided.

It is a further object of the invention to provide improved methods and means for the low temperature separation of oil and gas in which a preliminary separation of the well stream into liquid and gaseous phases is obtained, followed by pressure reduction of the liquid phase and separation thereof into further gaseous and liquid portions, the liquid portion being introduced into a low temperature separation vessel in a warm zone or area thereof, and the gaseous portion being introduced into the vessel in a cold zone or area thereof.

Yet another object of the invention is to provide improved methods and means of the character described in which a low temperature separation vessel is maintained with an accumulation of relatively warm liquids in its lower portion, and a gaseous stratum in its upper portion divided into a warm and a cold zone, the well stream being initially divided into a gaseous and a liquid phase, followed by resolution of the liquid phase into oil and gas portions, and wherein the oil portion is introduced into the low temperature separation vessel below the liquid level therein, and the gas portion is introduced into the cold portion of the gas stratum within the low temperature separation vessel; and further, wherein the liquid portion may be introduced into the low temperature separation vessel below the surface of that portion of the liquid stratum in the vessel overlain by a warm gas zone, and the gas portion is introduced into the cold zone of the gas stratum of the vessel at a point remote from the gas discharge outlet leading from the low temperature separation vessel.

An additional object of the invention is to provide improved methods and means of the character described in which the secondary separation of the liquids removed from the well stream in the high pressure separator is carried out under such condition that discharge of the separated gas into the warm zone of the low temperature separator adjacent the gas discharge outlet is effectively prevented, and such gas is forced to flow through the cold gas zone within the low temperature separation vessel for effective denuding thereof.

A construction designed to carry out the invention will be hereinafter described, together with other features of the invention.

Figure 2:
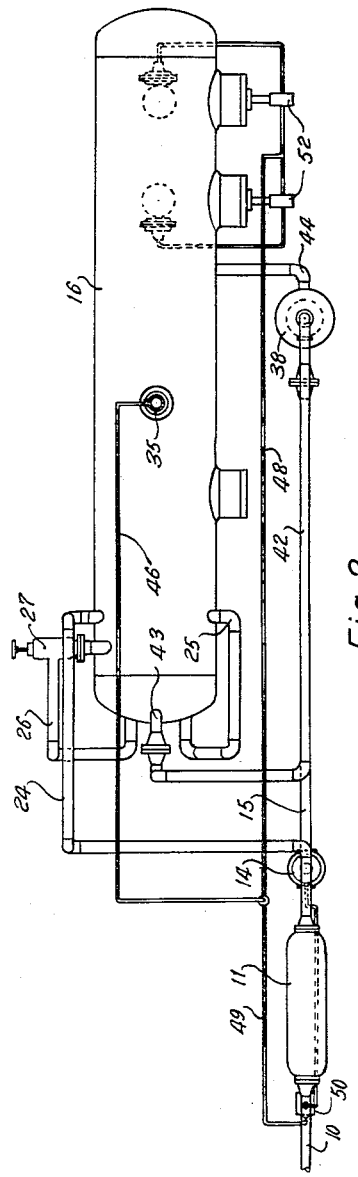

The invention will be more readily understood from a reading of the following specification and by reference to the accompanying drawings, wherein an example of the invention is shown, and wherein:

Fig. 1 is a side elevational view of a low temperature separation system constructed in accordance with this invention and adapted to carry out the methods hereof, Fig. 2 is a plan view of the separation system, Fig. 3 is an end elevation of the system taken from the inlet end of the low temperature separation vessel, Fig. 4 is a vertical, longitudinal, sectional view of the low temperature separation vessel showing the secondary or supplementary separator in dotted lines, Fig. 5 is a vertical, cross-sectional view taken upon the line 5—5 of Fig. 4, Fig. 6 is a view similar to Fig. 4 showing a modification of the invention, and Fig. 7 is a vertical, cross-sectional view taken on the line 7—7 of Fig. 6.

In the drawings, the numeral 10 designates a well stream inlet conductor leading to the upper separation chamber 11 of a high pressure oil and gas separator 12. Within the separator 12, the relatively warm well stream is separated or resolved into gaseous and liquid phases, the liquid phase accumulating in the lower chamber 13 of the separator and being discharged therefrom through an outlet valve 14 into a liquid phase conductor 15.

A low temperature separation vessel or enclosure 16 is also provided, as shown in Fig. 4, the low temperature separation vessel comprising an elongate, horizontal vessel 17 having its inlet end closed by a dished head 18, and its outlet end closed by a dished head 19. A heating coil 20 is provided in the lower portion of the vessel 17, and a centrifugal separator structure 21 is positioned in the upper portion of the inlet end of the vessel and provided with a tangential inlet 22 entering the vessel 17 laterally through one side wall thereof. A circular heating coil 23 is provided on the lower portion of the separator structure 21, and a gaseous phase conductor 24 extends from the upper chamber 11 of the separator 12 to the inlet end of the coil 23. Thus, the relatively warm gas separated from the well stream in the separator 12 is caused to flow through the coil 23 to supply a degree of heat to the lower portion of the structure 21 and prevent the accumulation of the gas hydrates or ice particles thereon.

A gas phase discharge conductor 25 leads from the outlet of the coil 23 to the inlet of the heating coil 20, and a further conductor 26 leads from the outlet of the coil 20 through a pressure reducing choke or other well stream cooling means 27 connected to the inlet 22. By means of this structure, the relatively warm gas portion of the well stream is also caused to flow through the heating coils 20 and thus supply heat to the lower portion of the low temperature separation vessel 17, following which the gaseous stream undergoes pressure reduction, or other cooling step, immediately prior to entry into the low temperature separation vessel. The chilling thus obtained results in the precipitation of water and hydrocarbons from the well stream and the creation of an elongate, horizontal, cold gas stratum in the upper portion of the vessel 17.

Ice particles or gas hydrates may be formed in the cooling or pressure reduction step, along with the precipitation of liquids, and these particles or hydrates, along with the precipitated liquids, stratify and collect in the lower portion of the vessel 17 into water and oil layers. The supplying of heat through the coil 20 warms the liquid strata sufficiently to melt any gas hydrates or ice particles which may be present so that the accumulation of such hydrates and impairment of the operation of the low temperature separation vessel is avoided.

For the establishment of liquid strata in the lower portion of the vessel 17, and for discharging separated water and oil from the vessel as the same is removed from the well stream, an upstanding weir plate 28 is provided adjacent the outlet end of the vessel 17 and enclosing with the head 19 a water discharge sump 29. An open-top box or trough 30 is also provided in the vessel adjacent the weir plate 28 and is provided with one wall 31 over which separated oil may skim into the box 30 for withdrawal from the vessel. Floats 32 may be provided in the sump 29 and box 30 for the operation of discharge valves 33 in the outlet lines 34 leading from the sump and box. Thus, separated oil and water are withdrawn separately and in accordance with the rate at which they tend to accumulate within the vessel 17.

As set forth in U. S. Letters Patent of Joseph L. Maher et al., No. 2,738,026, issued March 13, 1956, it is desirable to divide the gas stratum in the vessel 17 into a cold gas zone or area and a warm gas zone or area, the cold gas area being elongate and horizontal in nature, and extending from the inlet 22 to a gas outlet conductor 35 remote from or spaced horizontally from the inlet 22 whereby the gas is caused to flow in an elongate horizontal path through the low temperature separator. For establishing and maintaining a warm gas area in the vessel overlying the sump 29 and box 30, as well as that end portion of the liquid strata in the vessel 17 remote from the inlet end thereof, a baffle structure is provided in the upper portion of the vessel 17 between the gas outlet conductor 35 and the sump and box structure 29 and 30. The baffle structure includes a depending, insulating baffle 36 extending from the upper wall of the vessel 17 to a point spaced above the liquid level therein, and a second baffle 37 closely adjacent the baffle 36 and extending from a point below the liquid level in the vessel 17 upwardly to a point spaced below the upper wall of the vessel 17 in a vertical plane between the baffle 36 and the box 30. Since relatively warm gas will be evolved from the liquids present between the baffle 37 and the head 19, such evolved warm gas will tend to flow over the upper edge of the baffle 37 and under the lower edge of the baffle 36 to reach the gas outlet conductor 35. The cold gas present between the baffle structure and the inlet 22 to the low temperature separation vessel will display no tendency to rise through the warm gas present between the baffles 36 and 37, and hence, the cold gas will be excluded from that zone of the vessel 17 between the baffle structure and the head 19.

The structure thus far described is substantially identical to that disclosed in U. S. Patents 2,747,002, issued May 22, 1956, and 2,738,026, issued March 13, 1956. It has been found, however, in the case of relatively rich well streams, or well streams containing considerable quantities of oil or distillate, the quantities of separated liquids passing through the vessel 17, and especially of separated hydrocarbons, is sufficiently large that adequate heating thereof is not obtained, and gas hydrates or ice particles tend to accumulate within the vessel 17. In a given vessel, the amount of heat transfer area obtainable in the heating coil 20 is limited, as well as the temperature at which the well stream may be passed through the coils 20. Hence, in some instances, it has been found difficult to supply sufficient heat to the lower portion of the vessel 17, and an additional source of heat is often desirable.

The liquids separated from the well stream in the high pressure separator 12 are relatively warm, and may be employed as an additional source of heat by introduction into the vessel 17. It is important, however, that these secondary, relatively warm liquids be excluded from contact with the cold gas within the low temperature separator while maintaining the effective denuding of the gas which will be evolved from the secondary liquids when they undergo the pressure drop necessary to enter the vessel 17 which is operating at a pressure somewhat below that of the high pressure separator 12.

If the secondary liquids are allowed to enter the vessel 17 adjacent the cold stream inlet 22, the liquids will be subjected to the action of the cold gas stratum, and their supplementary heating effect will be lost. The secondary liquids may be introduced into the vessel adjacent the warm gas area or zone thereof, but in this case, the gases evolving from the liquids will pass directly under the baffle 36 and out the gas conductor 35 without effective denuding and removal of water and condensible hydrocarbons. The chilling of this warm gas in its passage through the outlet conductor 35 and the commingling therein with the cold gas from the cold gas zone of the low temperature separator will result in the precipitation of hydrocarbons and the formation of gas hydrates, thus obstructing or clogging the outlet conductor 35, as well as causing the loss of valuable hydrocarbons.

There are also instances in which well streams contain appreciable quantities of paraffin which remain in solution only so long as the well stream is maintained relatively warm. For this reason also, in some cases, it is desirable to prevent any of the separated liquids from becoming too thoroughly chilled, and especially those liquids removed in the high pressure separator.

It is known to conduct the liquid phase separated in the high pressure separator into the low temperature separation vessel, or even to conduct such liquids into an additional stratification and removal sump, as set forth in U. S. Letters Patent of Joseph L. Maher, et al., No. 2,728,406, issued December 27, 1955. In each case, however, this separated liquid phase is either undesirably subjected to the action of the cold gas stratum, at least a portion of the separated gases are not thoroughly denuded of water and hydrocarbons, or insufficient circulation of separated water to the sump 29 results in the chilling and/or freezing of the water accumulated within the sump.

The foregoing difficulties and problems are resolved in the present invention by the methods and structures disclosed herein wherein the separated, relatively warm, liquid phase is conducted from the lower portion 13 of the high pressure separator 12 through the pipe 15 into a secondary separator 38. The secondary separator 38 may comprise a relatively small vertical vessel 39 having a liquid phase inlet 40 to which the pipe 15 is connected. Desirably, a diverter box 41 is provided on the interior of the vessel 39 overlying the inlet 40 to divert the incoming liquid stream and cause a reduction in the velocity thereof. A gas discharge conductor 42 leads from the upper end of the vessel 39 to the inlet end of the vessel 17, preferably extending thereinto through the head 18, as shown at 43.

An elbow or dip tube 44 extends downwardly within the vessel 39 to a point adjacent the lower end thereof, the upper outlet end of the tube 44 extending through the side wall of the vessel 39 and into the vessel 17 at an elevation below the liquid level maintained in the latter. The pressures within the vessel 17 and separator 39 will be substantially equalized through the pipe 42, and hence, the flow of liquid from the vessel 39 into the vessel 17 will occur through a siphon or U-tube effect. By this means, the lower or inlet end of the dip tube 44 is covered by liquid at all times, and the passage of gas through the dip tube into the vessel 17 is prevented.

While the upper or outlet end of the elbow 44 for conducting the separated liquid portion from the secondary separator 39 into the low temperature separation vessel 17 may open into the vessel 17 at numerous locations, it should open thereinto below the liquid level maintained by the weir plates 28 and 31, or within the warm gas zone overlying such liquid level. Thus, the liquid portion is excluded from contact with the cold gas within the vessel 17, and the heat thereof is conserved for the liquid stratum in the vessel 17. Most desirably, the liquid portion inlet to the vessel 17 is positioned both below the liquid level and at a point overlain, at least in part, by the warm gas area or zone, whereby it is made doubly certain that the heat of the liquid portion is conserved for effective use in the low temperature separator. Such point of introduction, being adjacent the point of liquid discharge from the vessel 17, also insures that the heat of the liquid portion will be employed to melt any last trace of gas hydrate or ice particles which may be present adjacent the liquid outlet from the vessel 17.

The valves 14 and 33 may be of any suitable or desirable type, but preferably are of the diaphragm or motor type operated through a supply of pilot gas controlled by a pilot mechanism. Thus, a supply of dry, denuded pilot gas may be withdrawn from the gas outlet conductor 35 through a small branch conductor 46 leading through a pressure reducing device 47 to a manifold 48. A pilot gas supply branch 49 extends from the manifold 48 to a conventional pilot device 50 mounted upon the high pressure separator 12 and operated by a suitable float (not shown) positioned within the lower vessel 13 of the separator 12. Similarly, branch conductors 51 lead to pilot mechanisms 52 operated by the floats 32 and controlling the supply of operating gas to the valves 33. Such float, pilot, and diaphragm outlet valve systems are well known in the petroleum industry and do not require further description.

The separating structure may be modified to some extent, as shown in Figs. 6 and 7, by positioning the secondary separator 38 adjacent the inlet end of the low temperature separator 16 and connecting the upper end of the dip tube 44 into the vessel 17 at a point below the liquid level therein and adjacent the head 18, as shown at 53. With this modified arrangement, the separated liquid is still protected from contact with the cold gas in the vessel 17, and the heat content of the liquid is made available to the liquid strata in the vessel 17.

In the operation of the system, the well stream is initially separated into gaseous and liquid phases, the gaseous phase being passed through a pressure reduction or other chilling step prior to introduction into the low temperature separation vessel 17 wherein the chilled gaseous phase is resolved into gas and liquid strata. Means is provided for dividing the gas stratum into a warm gas zone or area and a cold gas zone, the chilled gaseous phase being introduced into one end of the cold gas area, and dry, denuded gas being withdrawn from the opposite end thereof. The liquid phase is passed through a secondary separation step wherein it is resolved into gas and liquid portions, the gas portion being introduced into the low temperature separation vessel at the inlet end of the cold gas area for thorough separation and denuding of the gas portion, the liquid portion being introduced into the vessel in a warm zone thereof, and preferably beneath the level of the liquid stratum at a point at which the liquid stratum is overlain by the warm gas area.

In this manner, the heat of the liquid portion is conserved for effective utilization within the liquid stratum of the low temperature separation vessel, and at the same time, the gas portion is subjected to the chilling and effective separation and rectification obtaining within the cold gas area of the low temperature separation vessel.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of low temperature separation of oil and gas including the steps of, passing a relatively warm high pressure well stream through a preliminary separation step in which the stream is resolved into a gaseous phase and a relatively warm liquid phase, conducting the gaseous phase through a chilling step and discharging the chilled gaseous phase into a low temperature separation enclosure in which the chilled gaseous phase is resolved into a liquid stratum and a gas stratum, supplying heat to the liquid stratum, conducting the liquid phase from the preliminary separation step to a secondary separation step wherein the liquid phase is resolved into a gaseous portion and a relatively warm liquid portion, conducting the gaseous portion into the gas stratum, conducting the liquid portion into a relatively warm zone of the low temperature separation enclosure, and withdrawing gas and liquid from the enclosure.

2. The method of low temperature separation of oil and gas including the steps of, passing a relatively warm high pressure well stream through a preliminary separation step in which the stream is resolved into a gaseous phase and a relatively warm liquid phase, conducting the gaseous phase through a chilling step and discharging the chilled gaseous phase into a low temperature separation enclosure in which the chilled gaseous phase is resolved into a liquid stratum and a gas stratum, supplying heat to the liquid stratum, conducting the liquid phase from the preliminary separation step to a secondary separation step wherein the liquid phase is resolved into a gaseous portion and a relatively warm liquid portion, conducting the gaseous portion into the gas stratum, conducting the liquid portion into the liquid stratum within the low temperature separation enclosure, and withdrawing gas and liquid from the enclosure.

3. The method of low temperature separation of oil and gas including the steps of, passing a relatively warm high pressure well stream through a preliminary separation step in which the stream is resolved into a gaseous phase and a relatively warm liquid phase, conducting the gaseous phase through a chilling step and discharging the chilled gaseous phase into a low temperature separation enclosure in which the chilled gaseous phase is resolved into a liquid stratum and a gas stratum divided into a cold gas area and a warm gas area, supplying heat to the liquid stratum, conducting the liquid phase from the preliminary separation step to a secondary separation step wherein the liquid phase is resolved into a gaseous portion and a relatively warm liquid portion, conducting the gaseous portion into the cold gas area of the gas stratum, conducting the liquid portion into a relatively warm zone of the low temperature separation enclosure, and withdrawing gas and liquid from the enclosure.

4. The method of low temperature separation of oil and gas including the steps of passing a relatively warm high pressure well stream through a preliminary separation step in which the stream is resolved into a gaseous phase and a relatively warm liquid phase, conducting the gaseous phase through a chilling step and discharging the chilled gaseous phase into a low temperature separation enclosure in which the chilled gaseous phase is resolved into a liquid stratum and a gas stratum divided into a cold gas area and a warm gas area, supplying heat to the liquid stratum, conducting the liquid phase from the preliminary separation step to a secondary separation step wherein the liquid phase is resolved into a gaseous portion and a relatively warm liquid portion, conducting the gaseous portion into the cold gas area of the gas stratum, conducting the liquid portion into a relatively warm zone of the low temperature separation enclosure overlain by at least a portion of the warm gas area whereby contact between the relatively warm liquid portion and the cold gas area is avoided and the heat of the liquid portion is conserved for the liquid stratum in the low temperature separation enclosure, and withdrawing gas and liquid from the enclosure.

5. The method of low temperature separation of oil and gas including the steps of, passing a relatively warm high pressure well stream through a preliminary separation step in which the stream is resolved into a gaseous phase and a relatively warm liquid phase, conducting the gaseous phase through a chilling step and discharging the chilled gaseous phase into one end of an elongate low temperature separation enclosure in which the chilled gaseous phase is resolved into a liquid stratum and a gas stratum, supplying heat to the liquid stratum, conducting the liquid phase from the preliminary separation step to a secondary separation step wherein the liquid phase is resolved into a gaseous portion and a relatively warm liquid portion, conducting the gaseous portion into the inlet end of the gas stratum, conducting the liquid portion into a relatively warm zone of the low temperature separation enclosure, withdrawing liquid from the enclosure, and withdrawing gas from a point in the gas stratum remote from the inlet end thereof.

6. The method of low temperature separation of oil and gas including the steps of, passing a relatively warm high pressure well stream through a preliminary separation step in which the stream is resolved into a gaseous phase and a relatively warm liquid phase, conducting the gaseous phase through a chilling step and discharging the chilled gaseous phase into one end of an elongate horizontal low temperature separation enclosure in which the chilled gaseous phase is resolved into a liquid stratum and a gas stratum divided into an elongate horizontal cold gas area and a warm gas area, supplying heat to the liquid stratum, conducting the liquid phase from the preliminary separation step to a secondary separation step wherein the liquid phase is resolved into a gaseous portion and a relatively warm liquid portion, conducting the gaseous portion into the inlet end of the cold gas area of the gas stratum, conducting the liquid portion into the liquid stratum within the low temperature separation enclosure at a point overlain by at least a portion of the warm gas area whereby contact between the relatively warm liquid portion and the cold gas area is avoided and the heat of the liquid portion is conserved for the liquid stratum in the low temperature separation enclosure, withdrawing liquid from the enclosure, and withdrawing gas from a point in the gas stratum remote from the inlet end thereof.

7. A low temperature separator for oil and gas including, a preliminary gas and liquid separator for resolving a relatively warm well stream into a gaseous phase, a relatively warm liquid phase and having a well stream inlet, a low temperature separation vessel, means for causing the gaseous phase of the well stream to be chilled and conducting it from the preliminary separator to the low temperature separation vessel wherein the gaseous phase is resolved into gas and liquid strata, a secondary separator for resolving the relatively warm liquid phase of the well stream into a relatively warm liquid portion and a gaseous portion, means for conducting the liquid phase to the secondary separator, means for supplying heat to the low temperature separation vessel, a conductor for conducting the gaseous portion from the secondary separator to the gas stratum of the low temperature separation vessel, a second conductor for conducting the relatively warm liquid portion from the secondary separator to a warm zone of said vessel, and means for withdrawing gas and liquid from the vessel.

8. A low temperature separator for oil and gas including, a preliminary gas and liquid separator for resolving a relatively warm well stream into a gaseous phase, a relatively warm liquid phase and having a well stream inlet, a low temperature separation vessel, means for causing the gaseous phase of the well stream to be chilled and conducting it from the preliminary separator to the low temperature separation vessel wherein the gaseous phase is resolved into gas and liquid strata, means for dividing the gas stratum in the low temperature separation vessel into a cold gas area and a warm gas area, a secondary separator for resolving the relatively warm liquid phase of the well stream into a relatively warm liquid portion and a gaseous portion, means for conducting the liquid phase to the secondary separator, means for supplying heat to the low temperature separation vessel, a conductor for conducting the gaseous portion from the secondary separator to the cold gas area of the gas stratum of the low temperature separation vessel, a second conductor for conducting the relatively warm liquid portion from the secondary separator to a warm zone of said vessel, and means for withdrawing gas and liquid from the vessel.

9. A low temperature separator for oil and gas including, a preliminary gas and liquid separator for resolving a relatively warm well stream into a gaseous phase and a relatively warm liquid phase and having a well stream inlet, a lower temperature separation vessel, means for causing the gaseous phase of the well stream to be chilled and conducting it from the preliminary separator to the low temperature separation vessel wherein the gaseous phase is resolved into gas and liquid strata, means for dividing the gas stratum in the low temperature separation vessel into a cold gas area and a warm gas area, a secondary separator for resolving the relatively warm liquid phase of the well stream into a relatively warm liquid portion and a gaseous portion, means for conducting the liquid phase to the secondary separator, means for supplying heat to the low temperature separation vessel, a conductor for conducting the gaseous portion from the secondary separator to the cold gas area of the gas stratum of the low temperature separation vessel, a second conductor for conducting the relatively warm liquid portion from the secondary separator to a warm zone of said vessel overlain by at least a portion of the warm gas area whereby contact between the relatively warm liquid portion and the cold gas area is avoided and the heat of the liquid portion is conserved for the liquid stratum in the low temperature separation vessel, and means for withdrawing gas and liquid from the vessel.

10. A low temperature separator for oil and gas including, a preliminary gas and liquid separator for resolving a relatively warm well stream into a gaseous phase, a relatively warm liquid phase and having a well stream inlet, a low temperature separation vessel, means for causing the gaseous phase of the well stream to be chilled and conducting it from the preliminary separator to the low temperature separation vessel wherein the gaseous phase is resolved into gas and liquid strata, a secondary separator for resolving the relatively warm liquid phase of the whell stream into a relatively warm liquid portion and a gaseous portion, means for conducting the liquid phase to the secondary separator, means for supplying heat to the liquid stratum in the low temperature separation vessel, a conductor for conducting the gaseous portion from the secondary separator to the gas stratum of the low temperature separation vessel, a second conductor for conducting the relatively warm liquid portion from the secondary separator into the liquid stratum in the low temperature separation vessel, and means for withdrawing gas and liquid from the vessel.

11. A low temperature separator for oil and gas including, a preliminary gas and liquid separator for resolving a relatively warm well stream into a gaseous phase, a relatively warm liquid phase and having a well stream inlet, a low temperature separation vessel, means for causing the gaseous phase of the well stream to be chilled and conducting it from the preliminary separator to the low temperature separation vessel wherein the gaseous phase is resolved into gas and liquid strata, means for maintaining a liquid level in the vessel, a secondary separator for resolving the relatively warm liquid phase of the well stream into a relatively warm liquid portion and a gaseous portion, means for conducting the liquid phase to the secondary separator, means for supplying heat to the low temperature separation vessel, a conductor for conducting the gaseous portion from the secondary separator to the gas stratum of the low temperature separation vessel, a second conductor for conducting the relatively warm liquid portion from the secondary separator to a warm zone of said vessel, and means for withdrawing gas and liquid from the vessel, the second conductor opening into the secondary separator in a plane spaced well below the liquid level in the low temperature separation vessel.

12. A low temperature separator for oil and gas including, a preliminary gas and liquid separator for resolving a relatively warm well stream into a gaseous phase, a relatively warm liquid phase and having a well stream inlet, an elongate horizontal low temperature separation vessel, means for causing the gaseous phase of the well stream to be chilled and conducting it from the preliminary separator to the low temperature separation vessel wherein the gaseous phase is resolved into elongate horizontal gas and liquid strata, means for dividing the gas stratum in the low temperature separation vessel into a cold gas area and a warm gas area, a secondary separator for resolving the relatively warm liquid phase of the well stream into a relatively warm liquid portion and a gaseous portion, means for conducting the liquid phase to the secondary separator, means for supplying heat to the liquid stratum in the low temperature separation vessel, a conductor for conducting the gaseous portion from the secondary separator to one end of the cold gas area of the gas stratum of the low temperature separation vessel, a second conductor for conducting the relatively warm liquid portion from the secondary separator into a point in the liquid stratum in the low temperature separation vessel overlain by the warm gas area, and means for withdrawing gas and liquid from the vessel.

13. A low temperature separator for oil and gas including, a preliminary gas and liquid separator for resolving a relatively warm well stream into a gaseous phase, a relatively warm liquid phase and having a well stream inlet, an elongate horizontal low temperature separation vessel, means for causing the gaseous phase of the well stream to be chilled and conducting it from the preliminary separator to the low temperature separation vessel wherein the gaseous phase is resolved into elongate horizontal gas and liquid strata, means for dividing the gas stratum in the low temperature separation vessel into a cold gas area and a warm gas area, means for maintaining a liquid level in the vessel, a secondary separator for resolving the relatively warm liquid phase of the well stream into a relatively warm liquid portion and a gaseous portion, means for conducting the liquid phase to the secondary separator, means for supplying heat to the liquid stratum in the low temperature separation vessel, a conductor for conducting the gaseous portion from the secondary separator to one end of the cold gas area of the gas stratum of the low temperature separation vessel, a second conductor for conducting the relatively warm liquid portion from the secondary separator into a point in the liquid stratum in the low temperature separation vessel overlain by the warm gas area, and means for withdrawing gas and liquid from the vessel, the second conductor opening into the secondary separator through a downwardly directed elbow having an open lower inlet end disposed within the secondary separator in a plane spaced well below the liquid level in the low temperature separation vessel.

14. A low temperature separator for oil and gas including, a preliminary gas and liquid separator for resolving a relatively warm well stream into a gaseous phase, a relatively warm liquid phase and having a well stream inlet, an elongate horizontal low temperature separation vessel, means for causing the gaseous phase of the well stream to be chilled and conducting it from the preliminary separator to the low temperature separation vessel wherein the gaseous phase is resolved into elongate horizontal gas and liquid strata, means for dividing the gas stratum in the low temperature separation vessel into a cold gas area and a warm gas area, a secondary separator for resolving the relatively warm liquid phase of the well stream into a relatively warm liquid portion and a gaseous portion, means for conducting the liquid phase to the secondary separator, means for supplying heat to the liquid stratum in the low temperature separation vessel, a conductor for conducting the gaseous portion from the secondary separator to one end of the cold gas area of the gas stratum of the low temperature separation vessel, a second conductor for conducting the relatively warm liquid portion from the secondary separator into a point in the liquid stratum in the low temperature separation vessel overlain by the warm gas area, a gas outlet from the cold gas area remote from the inlet end thereof, and a liquid outlet from the vessel adjacent the point of admission to the vessel of the relatively warm liquid portion.

References Cited in the file of this patent
UNITED STATES PATENTS 2,758,665     Francis _____ Aug. 14, 1956